Oct. 15, 1940.　　J. W. TAYLOR　　2,218,364
APPARATUS FOR CLEANING RESINS
Filed May 14, 1938　　2 Sheets-Sheet 1

Inventor
JAMES W. TAYLOR

Oct. 15, 1940.  J. W. TAYLOR  2,218,364
APPARATUS FOR CLEANING RESINS
Filed May 14, 1938  2 Sheets-Sheet 2
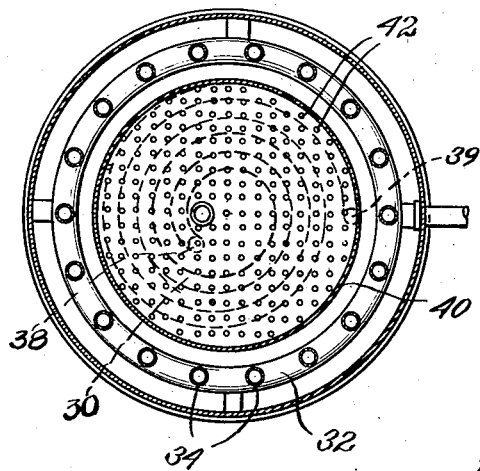
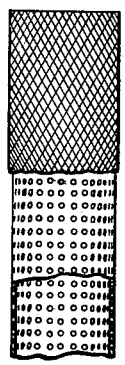
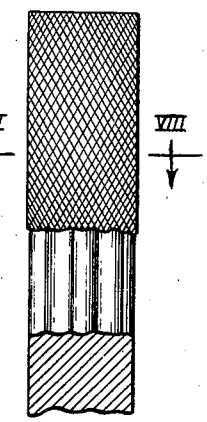
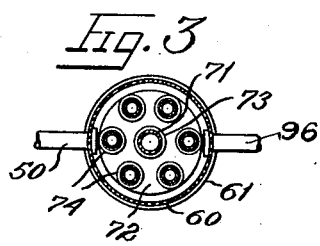
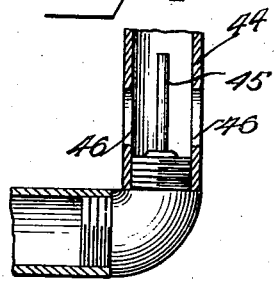
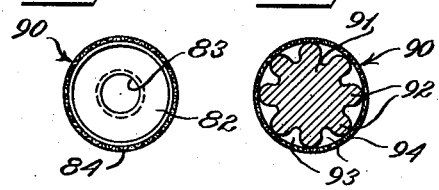
Inventor
JAMES W. TAYLOR Patented Oct. 15, 1940

2,218,364

UNITED STATES PATENT OFFICE 2,218,364

APPARATUS FOR CLEANING RESINS

James W. Taylor, Pensacola, Fla., assignor to Peninsular-Lurton Company, Pensacola, Fla., a corporation of Florida Application May 14, 1938, Serial No. 208,083

5 Claims. (Cl. 210—49.5)

This invention relates to apparatus for removing solid foreign matter from the crude exudate or oleoresin collected from pine trees and the like, as in the manufacture of gum rosin or other resins or gums.

More specifically the invention relates to apparatus for removing wood chips, bark, sand, insects and other solid extraneous matter from the crude oleoresin, or turpentine, as it is collected from trees.

Oleoresin or gum as usually delivered to a refining plant is in a very crude state containing many foreign bodies. According to this invention, the solid foreign bodies or bodies of considerably higher melting points than the desired oleoresin are removed from the resin.

In carrying out the invention, the crude oleoresin containing all of the usual solid impurities therein is dumped into a perforated basket capable of retaining the larger sized solid foreign bodies therein. The basket is housed in a heating tank or digester equipped with steam pipes beneath the basket and extending around the lower wall portion of the basket. The heating tank or digester is sealed from the atmosphere and steam is supplied to the heating tank for melting a portion of the resin in the basket.

The melted resin drains to the bottom of the heating tank, and when a sufficient quantity has been collected in the bottom of the tank, a steam injector is actuated to further heat and recirculate the melted resin back into the basket. This recirculated heated resin is forced upwardly into the mass of resin in the basket to speed up the melting operation.

When all of the resinous material has been melted in the heating tank, the steam injector is shut off and the finer solid impurities capable of passing through the basket are allowed to settle to the bottom of the tank. This settling operation removes appreciable amounts of sand, dirt and the like heavy solid materials.

After the settling operation, the molten resin is forced through filters having extended filtering surfaces, which are capable of retaining any remaining solid ingredients entrained in the molten resin.

The resin first fed to the filters is removed from the heating tank at a point well above the bottom thereof so that the sediment at the bottom of the tank will not come through at the first and rapidly clog the filters. Then, after the less polluted resin has been filtered, the settlings can be filtered through the same filters.

The apparatus of this invention is constructed to speed up the cleaning process and to increase the capacity of a given filter area by retaining the larger sized solid ingredients in the perforated basket and by providing a settling chamber for the denser solid impurities that may be capable of passing through the perforations of the basket.

It is, then, an object of this invention to provide apparatus for rapidly and efficiently removing solid foreign matter from crude oleoresin and other resins, gums or the like.

Another object of the invention is to provide apparatus for cleaning oleoresin that includes a coarse filter to remove large sized solid ingredients, a settling chamber and a finer filter.

A further object of this invention is to provide an efficient digester and filter unit for cleaning oleoresin.

A further object of the invention is to provide an oleoresin cleaning device with a steam jet pump to recirculate a portion of the melted oleoresin for speeding up the entire melting and filtering operation.

Other and further objects of the invention will become apparent to those skilled in the art from the following detailed description of the annexed sheets of drawings.

The apparatus shown on the drawings represents a preferred form of the device according to this invention.

On the drawings:

Figure 2 is a horizontal cross-sectional view taken along the line II—II of Figure 1.

Figure 3 is a horizontal cross-sectional view taken along the line III—III of Figure 1.

Figure 4 is a detail view, partly in section, of the steam jet pump forming part of the apparatus shown in Figure 1.

Figure 5 is a broken elevational view of one of the filtering tubes, with parts broken away and shown in vertical section.

Figure 6 is a top plan view of the filter tube shown in Figure 5.

Figure 7 is a broken elevational view of an alternative form of filter tube usable in the filter apparatus, with parts broken away and shown in vertical section.

Figure 8 is a horizontal cross-sectional view taken along the line VIII—VIII of Figure 7.

As shown on the drawings:

Figure 1:
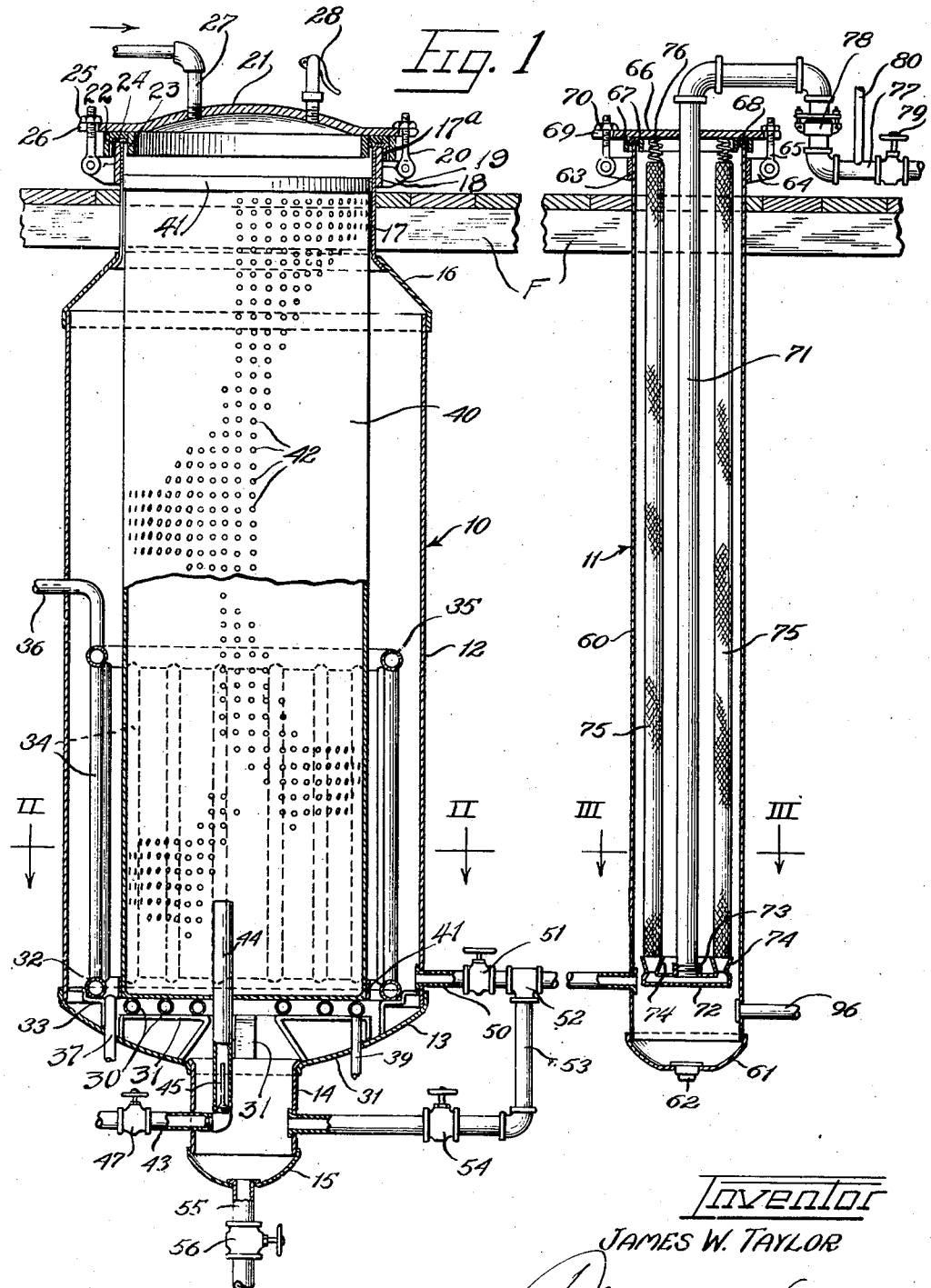
Figure 1 is a vertical cross-sectional view, with parts shown in elevation, of a cleaning device embodying this invention and including a heating tank or digester and a filter unit.

In Figure 1 the reference numeral 10 designates generally the heating tank or digester unit and the reference numeral 11 designates generally the filter unit of the apparatus.

The heating tank 10 comprises a cylindrical imperforate metal shell 12 having a dished bottom head 13 riveted and welded to the lower end thereof. The head 13 has a central opening receiving a cylindrical sump forming member 14, which is closed by a dished cap 15. A drain line 55, provided with a valve 56, is connected through said cap 15 to drain the sump so formed.

To the top portion of the cylinder 12 is welded a convergent ring 16, into the smaller upper end of which a cylindrical member 17 is fitted and welded. A reinforcing steel collar 18 is riveted or welded around the upper end of the cylinder 17, the edge 17a of which is turned down over the outside of the collar 18. Said collar 18 is provided with lugs or ears 19 that project radially therefrom at spaced intervals for pivotally supporting eye bolts 20.

A cover 21 closes the upper end of said tank 10. Said cover is provided on its under surface with spaced annular rings 22 and 23 that form a groove for receiving the top edge 17a of the cylinder 17. An annular gasket 24 is disposed in the groove between the rings 22 and 23 to form a seal for the cover 21 when the latter is clamped in place by means of nuts 25 threaded on the eye bolts 20. The eye bolts 20 project through peripheral slots 26 in the cover 21.

In installing the tank 10, it is convenient to have the cylindrical neck portion 17 extend through the floor F to facilitate the charging or loading operation.

The cap 21 has a steam inlet pipe 27 threaded therethrough and carries a safety valve 28. Steam is allowed to escape through the safety valve 28, either continuously during the direct steaming operation or at the will of the operator, by setting the valve at a pressure lower than that of the steam introduced through the jet, which will later be described.

A spiral heating coil 30 is mounted in the bottom of the tank 10 on supports 31, which are welded to the bottom head 13.

An annular steam header 32, as best shown in Figures 1 and 2, is also mounted in the bottom above the coil 30 on supports 33 welded to the bottom head 13. The supports 31 and 33 are positioned at spaced intervals around the bottom head so as to permit flow of liquid from the top portion of the tank 10 into the sump 14.

Spaced vertical steam pipes 34 extend upwardly from the header 32 to about mid-height of the tank and terminate in an upper annular header 35. Steam is supplied to the upper header 35 through a pipe 36 that passes through the side wall of the cylinder 12, any condensate and exhaust steam being removed from the bottom header 32 through a drain line 37 extending through the bottom head 13.

Steam is supplied at the center of the coil 30 through a pipe 38 and condensate and exhaust steam are removed at the outer end of the coil through a pipe 39.

An elongated cylindrical basket 40 of foraminous metal is mounted within the tank 10, with its bottom resting on top of the spiral coil 30 and with its upper end snugly fitting within the cylindrical neck 17. Metal reinforcing rings 41 are secured around the top and bottom of the basket.

The perforations 42 in the side wall and bottom of the basket 40 are preferably not over ¼ inch in diameter. If desired, a metal screen can form the body of the basket.

A jet pump 43 is mounted in the sump 14 with its discharge leg 44 extending upwardly for a short distance through an opening provided for the purpose in the bottom of the basket 40. As best shown in Figure 4, the jet pump includes a restricted jet 45 fitted within a lower portion of the vertical leg 44 that is provided with circulating openings 46. A valve 47 is provided for controlling flow of steam through the jet 45. In operation the molten resin, or other fluid substance in the sump is drawn in through the openings 46 by the action of the high velocity steam discharged through the jet 45. The mixture of steam and molten resin is thus drawn upwardly into the basket for a purpose to be more fully hereinafter described.

A pipe 50 enters the side wall of the cylinder 12 above the bottom head 13 for conveying material from the tank 10 to the bottom of the filter unit 11. The pipe 50 has a T fitting 52 into which is connected a branch pipe 53 from the sump portion 14 of the tank 10. The pipe 50 and branch pipe 53 are provided with valves 51 and 54, respectively.

The filter unit 11 comprises a cylindrical metal casing 60, the upper end of which also projects through the floor F. A bottom head 61, provided with a drain plug 62, is welded to the lower end of the casing 60.

A ring 63, secured around the top end of the casing 60 above the floor F, is provided with laterally projecting peripherally spaced lugs or ears 64 for supporting swinging eye bolts 65.

A cap 66 having spaced rings 67 on the inner face thereof is adapted to be mounted on top of the casing, with the rings 67 forming an annular groove for receiving a gasket 68 that provides a seal between the top of the casing and said cap 66. The periphery of the cap has spaced slots 69 into which the eye bolts 65 are swung when the cap 60 is to be clamped to the casing. Nuts 70 on the eye bolts 65 are turned down against the top of the cap.

A manifold pipe 71 extends axially of the casing 60 through the cap 66, in which its upper end is secured, and terminates in spaced relation above the bottom head 61, preferably at about the level of the mouth of the pipe 50. A circular manifold member 72 having a central opening defined by a boss 73 is threaded on the end of the pipe 71. The manifold member 72 has a plurality of upwardly flaring annular mouths 74 positioned at spaced intervals around its periphery, six of such mouths being shown in Figure 3. Vertical filtering tubes 75 are seated at their lower ends in the mouths 74 of the manifold 72 and are held therein by means of springs 76 compressed between the cap 66 and the upper ends of said tubes. In this manner communication from the interior of each tube 75 is made with the pipe 71.

The pipe 71 is connected to a discharge line 77 through an easily detachable union 78. Upon disconnection of said union 78 and release of the eye bolts 65, the cap 66, pipe 71, manifold 72 and filtering tubes 75 may be lifted out bodily as a unit for cleaning or replacement. A valve 79 is provided in the line 77 and a steam inlet pipe 80 connected into said line 77 ahead of the valve for a purpose to be hereinafter more fully described.

As best shown in Figures 5 and 6, each of the filter tubes 75 comprises a perforated metal cylinder 81 closed at the top thereof and having a convergent end 82 provided with an opening 83 at the bottom thereof. Each tapered end 82 is adapted to seat in a mouth 74 of the manifold 72. A filtering medium such as cotton batting, or a porous textile fabric or other fine mesh screening material 84 is wrapped or otherwise tightly disposed around the cylindrical portion of each tube 81 for the full length thereof.

Molten resin introduced into the casing 60 can thus be forced through the filter screens 84 and the perforations of the tubes 81 into said tubes 81 and thence into the manifold 72, from which the resin passes upwardly under a pressure head out through the pipe 71.

If desired, perforated metal tubes such as 75 can be replaced with wooden filtering units such as 90 disclosed in Figures 7 and 8. Each of the units 90 comprises a solid wooden rod 91 having longitudinally extending flutes 92 providing grooves or passageways 93 along the length of the rod, and a fine mesh screen sleeve 94 tightly disposed around the rod.

Each rod 91 has a convergent lower end 95, fluted in the same manner as the length of the rod, that fits into a mouth 74 of the manifold 72 so that molten resin draining along the passageways 93 must flow into the manifold.

As shown in Figure 1, the bottom portion of the casing 60 has an inlet 96 through which steam may be introduced for agitating and heating the contents of the casing, or for drying filter cakes on the tubes 75.

In operating the apparatus of this invention, the crude oleoresin, gum, or other meltable solid is charged into the basket 40 of the tank 10. For the purposes of this description, it will be assumed that oleoresin is the particular material to be cleaned. The tank is then sealed by clamping the cover 21 thereon, and steam is introduced into the heating coil 30 and the bank of vertical heating tubes 34. The oleoresin in the bottom portion of the basket becomes quickly heated above its melting point and some molten oleoresin drains through the perforations of the basket into the bottom portion of the tank. The basket, however, retains the larger sized solid foreign matter.

When sufficient material is melted and drained into the bottom of the tank to cover the openings 46 of the jet pump 43, the valve 47 is opened to eject steam through the jet 45 and recirculate molten oleoresin back into the bottom portion of the basket 42 into contact with the solid resin remaining in the basket. The live steam so introduced through the jet pump increases the temperature of the molten oleoresin flowing therethrough and the condensate therefrom mixes directly therewith. Uncondensed steam, water vapor and spirits of turpentine vapors are vented through the relief valve 28.

The operation is continued until all of the desired meltable material is in a flowable state. The jet pump is then stopped by closing the valve 47 and the molten mass, including the associated steam condensate, in the tank 10 is allowed to stand to permit the finer solid material passing through the basket 40 to settle into the sump 14. In this manner, heavier solid material such as sand and sediment settles out below the level of the pipe 50.

After the settling operation, the valve 51 in the pipe line 50 is opened while the valve 54 in the branch pipe 53 remains closed.

Steam is introduced into the top of the tank 10 through the inlet pipe 27 to force the molten resin and associated condensate lying above the level of the pipe 50 into the casing 60 of the filter unit 11. The valve 79 in the discharge line 77 connected with the pipe 71 is opened and the molten resin filling the casing 60 is forced through the filter screens into the tubes 75. The molten resin flows down through the tubes 75 into the manifold 72 and is forced by the pressure differential existing between the interior of the casing and the interior of the pipe 71 upwardly through the pipe and into the line 77. If desired, steam may be introduced into the casing 60 through the inlet 96 to further heat the molten resin.

When the melted material in the tank 10 is drained down to the level of the pipe 50, the valve 54 in the branch pipe 53 can be opened to remove the more polluted resin out of the sump 14 into the casing 60 of the filtering unit for filtration through the filter tubes 75.

The sediment beneath the level of the branch pipe 53 in the sump 14 can finally be drained out through the drain line 55 by opening the valve 56.

After the filtering operation, the filter cake on the screens 84 of the tubes 75 can be removed or loosened, after closing the valve 79 in the drain line 77, by introducing steam through the inlet 80 into the pipe 71 for flow through the tubes 75 and out of the perforations thereof to blow the filter cake off of the screen surfaces. The solid material removed from the tubes collects at the bottom of the casing 60, from which it can be removed by removal of the plug 62.

The filter tubes themselves can be readily removed from the casing 60 by merely removing the cap 66 which releases the springs 76 and permits the tubes to be lifted out of the casing.

The apparatus of the invention, as is evident from the above description, provides for the recirculation of hot molten resin to assist in the melting of the remaining solid resin. Coarse solid particles are separated from the meltable material by being retained in the basket. The heavier, finer solids are separated by gravity settling, thereby increasing the capacity of the filters. The apparatus also provides for the recovery of clean resin from the sediment only after the filtration of the resin that has already been partially cleaned by the settling out step. In this manner the capacity of the filtering unit is greatly increased.

If desired, at the very end of the filtering operation steam can be introduced into the casing 60 through the pipe 96 for drying the filter cakes on the tubes 75 to remove the last traces of resin therein.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A resin cleansing device which comprises a heating tank having a sump chamber at the bottom thereof, a heating coil near the bottom of the tank above the sump chamber thereof, an open topped perforate basket for receiving crude resin positioned in said tank adjacent and above said heating coil, a cap for sealing the tank, a jet pump extending into the sump chamber and having a vertical leg discharging into said basket, said jet pump having a molten resin induction inlet in communication with the sump chamber, a valve controlled drain line from said tank communicating therewith above the sump chamber and a second valve controlled drain line from the bottom of said sump chamber whereby molten resin from the perforate basket can drain into the sump chamber and be recirculated back to the basket by said jet pump until the batch of resin is melted and solid materials entrained in the molten batch can be settled into said sump chamber for removal therefrom through said second drain line subsequent to the removal of the less contaminated molten resin through said first drain line.

2. Apparatus for cleansing oleoresins which comprises a heating tank and a filter casing, a valved pipe line joining said tank from a point above the bottom thereof with said casing, a settling chamber formed at the bottom of said heating tank, a valved branch pipe line joining the settling chamber with said first mentioned pipe line beyond the valve therein, a perforate basket for receiving a charge of crude oleoresins in said heating tank spaced above said settling chamber, means for sealing the tank with the basket therein, means for heating the tank to melt said oleoresins, a steam jet pump having a molten oleoresin intake from said settling chamber and having an upwardly directed discharge for recirculating said molten oleoresins into said basket, and means for introducing steam under pressure into the top of said heating tank for forcing molten oleoresins therefrom into said filter casing first through said first pipe line and then through said branch pipe line.

3. Apparatus for cleansing crude oleoresins and like fusible material containing solid foreign particles, comprising a heating tank having a sump, a foraminous basket in said tank above said sump for receiving a batch of said fusible material, means for indirectly heating said batch to cause a draining of molten material therefrom into said sump, means for injecting steam directly into molten material inducted from said sump to heat and recirculate the same through the contents of said basket to effect a rapid melting of the entire batch of fusible material, a filter unit, valved connections from said tank at a point above said sump and from said sump respectively to said filter unit, and means for introducing a fluid under pressure into said tank above the level of molten material therein whereby molten material substantially free from settleable solid particles first may be forced under fluid pressure through the upper of said connections into said filter unit and molten material containing sediment from said sump subsequently forced through the lower of said connections into said filter unit.

4. In a digester for meltable solids including a heating tank, a settling chamber therein, a sediment drain line therefrom, and a perforated charge supporting member in the lower part of said tank spaced above said settling chamber, the improvement which comprises a steam jet pump extending through said settling chamber and having an induction inlet communicating therewith but above the bottom thereof for withdrawing molten material therefrom and having a discharge outlet directed into and terminating in the lower interior of said tank above said perforated member for recirculating molten material from said settling chamber upwardly through the portion of the charge above said perforated member.

5. Apparatus for liquefying a batch of crude oleoresins and like fusible material containing solid foreign particles, comprising a heating tank having a sump, a sediment drain line therefrom, a foraminous batch supporting member in said tank above said sump for retaining the larger foreign particles and the unmelted portion of the batch, means within said tank adjacent said foraminous member for indirectly heating the portion of the batch supported thereon to cause a draining of molten material therefrom into said sump, a steam jet pump having a delivery jet opening directly into the portion of the batch supported on said foraminous member to melt said batch portion and having an induction inlet from said sump but above the bottom thereof to recirculate molten material from said sump upwardly into and through the batch portion supported on said foraminous member, and a connection from said tank above said sump bottom for the removal of molten material from which sediment has settled out.

JAMES W. TAYLOR.